UNITED STATES PATENT OFFICE.

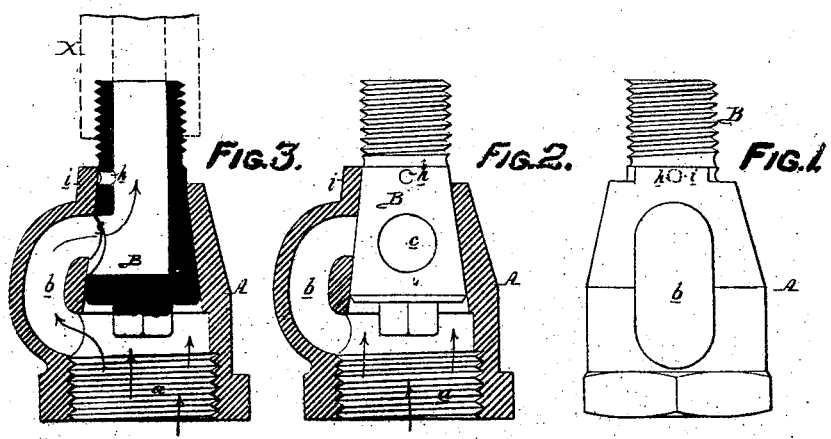

SOLOMON PFLEGER, OF READING, ASSIGNOR TO HIMSELF AND JAMES SHOEMAKER PFLEGER, OF TAMAQUA, PENNSYLVANIA.

IMPROVEMENT IN VALVE-COCKS FOR HYDRANTS.

Specification forming part of Letters Patent No. 103,773, dated May 31, 1870.

*To all whom it may concern:*

Be it known that I, SOLOMON PFLEGER, of Reading, county of Berks, State of Pennsylvania, have invented an Improvement on Valve-Cocks for Hydrants, &c., of which the following is a specification.

My invention relates to a valve-cock composed of a hollow casing and hollow conical valve, arranged in respect to each other as hereinafter explained, so that the pressure of the water or other fluid shall act directly upon either the valve or casing in such a manner as to constantly force the former into its seat.

In the accompanying drawings, Figure 1 is an external view, and Figs. 2 and 3 sectional views, of my improved valve-cock.

The cock consists of a casing, A, to a seat on the upper portion of which is adapted a hollow conical plug or valve, B. The casing A has a threaded branch, $a$, to which the inlet or supply pipe of the hydrant is attached, and this branch is situated immediately beneath the valve B, so that the whole pressure of the water as it enters the casing may be exerted against the end of the said valve, as indicated by the arrows, and thus have a constant tendency to force the same into its seat. A passage or channel, $b$, at one side of the casing A, forms a communication between the lower portion of the latter and an opening, $c$, in the side of the tubular valve B. An outlet-pipe, $x$, Fig. 3, is screwed onto the upper threaded end of the valve, and passes upward through the body of the hydrant, it having at its upper end a suitable nozzle, which serves also as a handle for turning the said outlet-pipe and valve when the water is to be turned on or off. The opening $c$ of the valve is brought opposite the channel $b$ of the casing, as shown in Fig. 3, when the water is to be turned on, and the valve is adjusted as shown in Fig. 2, in order to cut off the supply. When the valve is in this latter position, the water is not suffered to remain in the pipe $x$, but passes off through a drip-opening, $h$. When the water is turned on, however, this aperture is closed by a lip, $i$, of the casing, as seen in Figs. 1 and 3.

Steam-cocks, or cocks intended for regulating the flow of other fluids under pressure, may be constructed on the above principle as well as those for water.

I claim—

1. A valve-cock consisting of a casing, A, having a passage, $b$, and a conical valve, B, having an opening, $c$, the valve and casing being fitted together and arranged in respect to each other, substantially in the manner described, so that the pressure of the water or other fluid shall act directly upon the casing or valve, and have a constant tendency to force the latter tightly in its seat.

2. The lip $i$, arranged on the casing A, in respect to the opening $h$ in the valve, as specified.

In testimony whereof I have signed my name to this specification in the presence of two subscribing witnesses.

SOLOMON PFLEGER.

Witnesses:
 WM. B. SCHOENER,
 GEO. W. PFLEGER.